United States Patent [19]

Tomiyama et al.

[11] Patent Number: 5,166,934
[45] Date of Patent: Nov. 24, 1992

[54] SELF-DIAGNOIS AND REPAIR SYSTEM FOR IMAGE FORMING APPARATUS

[75] Inventors: Tetsuo Tomiyama, Chiba; Hiroyuki Yoshikawa; Yasushi Umeda, both of Tokyo; Yoshiki Shimomura, Kyoto; Yoshifumi Ishii, Osaka; Hiroshi Kusumoto, Wakayama, all of Japan

[73] Assignee: Mita Industrial Co., Ltd., Japan

[21] Appl. No.: 588,191

[22] Filed: Sep. 26, 1990

[51] Int. Cl.$^5$ .................. G06F 11/00; G01R 31/28
[52] U.S. Cl. .................. 371/16.4; 364/276.3; 364/281.9; 364/DIG. 1; 371/15.1; 395/916
[58] Field of Search .................. 371/15.1, 16.4; 364/276.3, 281.9; 395/50, 54, 916

[56] References Cited

U.S. PATENT DOCUMENTS

| | | | |
|---|---|---|---|
| 4,642,782 | 2/1987 | Kemper et al. | 364/550 |
| 4,697,243 | 9/1987 | Moore et al. | 364/513 |
| 4,739,366 | 4/1988 | Braswell et al. | 355/14 SH |
| 4,878,072 | 10/1989 | Reinten | 346/154 |
| 4,879,577 | 11/1989 | Mabrouk et al. | 355/208 |
| 4,964,125 | 10/1990 | Kim | 371/15.1 |
| 4,985,857 | 1/1991 | Bajpai et al. | 364/551.01 |
| 5,010,551 | 4/1991 | Goldsmith et al. | 371/16.4 |
| 5,023,817 | 6/1991 | Au et al. | 364/550 |

FOREIGN PATENT DOCUMENTS

63-240601 10/1988 Japan .
63-255701 10/1988 Japan .

OTHER PUBLICATIONS

Dodge et al., Self-Analysis of Copier Electronics, IBM Technical Disclosure Bulletin, vol. 24, No. 7A, Dec. 1981, pp. 3295-3297.

Wilkinson, MIND: An Inside Look at an Expert System for Electronic Diagnosis, IEEE Design & Test, Aug. 1985, p. 69-77.

Whitehead et al., Expert Systems Without an Expert: Fault Diagnosis Based on Causal Reasoning, TI Technical Journal, Winter 1987, pp. 19-29.

Umeda et al. "Model Based Diagnosis Using Qualitative Reasoning" as reprinted in Kimura and Rotstadas, editors, Computer Applications in Production and Engineering, Cape 1989, Tokyo, Japan pp. 443-450 (2-5 Oct. 1989).

Benjamin Kuipers, "Qualitative Simulation", Artificial Intelligence, 29 pages 289-338 (1986).

Jeff Shrager, et al, "Issues in the Pragmatics of Qualitative Modeling: Lessons Learned from a Xerographics Project", Communications of the ACM, vol. 20, No. 12, pp. 1036-1047 (Dec. 1987).

Nishida, Artificial Intelligence Society Meeting, Japan, Jul. 23, 1990, Sections 10.2 and 10.3.

*Primary Examiner*—Charles E. Atkinson
*Attorney, Agent, or Firm*—Beveridge, DeGrandi & Weilacher

[57] ABSTRACT

A system according to the invention has a plurality of sensors, a system control circuit and a plurality of actuators. State data, supplied from the sensors, is compared with characteristic data in the system control circuit. From this comparison, it is judged whether a fault has occurred depending upon whether the state data is relatively lower or higher. If a fault has occurred, fault inference fault is made on the basis of a comparison between qualitative data and fault diagnosis knowledge which are stored in the system control circuit. Then a judgement is made as to which of the elements in an image forming apparatus is abnormal. An actuator operating signal thereafter is generated as a result of this judgement.

39 Claims, 9 Drawing Sheets

SELF-DIAGNOIS AND REPAIR SYSTEM FOR IMAGE FORMING APPARATUS

BACKGROUND OF THE INVENTION

1. Field of the Invention

The present invention relates generally to a self-diagnosis and repair system for an image forming apparatus, and more particularly, to a system capable of making self-diagnosis and self-repair of the operating state and the like of an image forming apparatus utilizing artificial intelligence and knowledge engineering which have been studied extensively in recent years.

2. Description of the Prior Art

In the development field of precision instruments, industrial machines and the like, expert systems utilizing artificial intelligence (so-called AI) techniques have been being studied extensively in recent years for the purpose of realizing labor saving in maintenance work and long-term automatic operation. The expert systems include one for making self-diagnosis to judge whether or not a fault is caused in an apparatus and making self-repair of the fault caused.

In a fault diagnosis system by the conventional expert system, such limitations have been pointed out that (a) there is no versatility in knowledge, which makes it impossible to make a fault diagnosis on a variety of objects, (b) a diagnosis cannot be made on unknown faults, (c) the quantity of knowledge required for fault diagnosis is increased explosively as an object becomes complicated, thus making implementation difficult, (d) it is difficult to acquire knowledge, and the like.

More specifically, in a conventional automatic control system and fault diagnosis system, an actuator corresponding to a sensor is basically made to operate on the basis of an output of the sensor. That is, a type of automatic control and fault diagnosis has been made by a predetermined combination of a sensor and an actuator. Accordingly, a certain sensor basically corresponds to a particular actuator, and the relationship therebetween has been stationary. Therefore, the conventional system has the following disadvantages:

(1) The relationship between parameters of the sensor and parameters of the actuator must be clearly expressed numerically.

(2) From the reason mentioned in the above item (1), the relationship between parameters of the sensor and parameters of the actuator depends largely on an objective machine. Accordingly, the conventional system is lacking in versatility, that is, cannot be utilized for a variety of objects.

(3) The relationships between parameters of respective sensors and between parameters of respective actuators have no relation with control. Consequently, only simple control based on the relationship between parameters of the sensors and parameters of the actuators which correspond to each other can be carried out.

More specifically, in the designing stage, faults which might occur must be forecast and mechanisms for countermeasures against the faults must be incorporated, and unknown faults cannot be handled.

(4) From the reason mentioned in the above item (3), secondary effects exerted on other actuators might be caused by the operation of an arbitrary actuator.

Thus, in the conventional automatic control system and fault diagnosis system, only a fault diagnosis based on sets respectively including independent sensors and actuators and fault repair based on the fault diagnosis have been made in such a manner that forecasting fault A is made on the basis of a set A of a sensor A and an actuator A, forecasting fault B is made on the basis of a set B of a sensor B and an actuator B, and forecasting fault C is made on the basis of a set C of a sensor C and an actuator C.

SUMMARY OF THE INVENTION

The present invention has been made for eliminating the disadvantages of the prior art and has for its object to provide a new self-diagnosis and self-repair system for an image forming apparatus.

According to the present invention, in response to the application of state data from data input means, the state data is compared with, for example, reference data serving as characteristic data. Consequently, it is judged that a fault is caused depending on whether the state data is relatively lower or higher.

The state data applied from the data input means is data indicating a function state of the image forming apparatus, which is manually measured and inputted by, for example, a serviceman.

If a fault is caused, inference of the fault caused is drawn on the basis of the comparison between qualitative data and fault diagnosis knowledge which are stored in storage means and the adjusted state of an actuator means applied from an adjusted state output means and the adjustable range of the actuator means set in an adjustable range setting means, and it is judged which of the elements of the image forming apparatus is abnormal to output the results of the judgement.

The serviceman or the like can simply repair the fault by operating the actuator means while referring to the above results outputted.

The qualitative data is not data intrinsic to a certain image forming apparatus but data common to a lot of image forming apparatuses and qualitatively expressed. Accordingly, a self-diagnosis and repair system according to the present invention can be simply incorporated into different types of image forming apparatuses.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Summary of system composition

Figure 1:
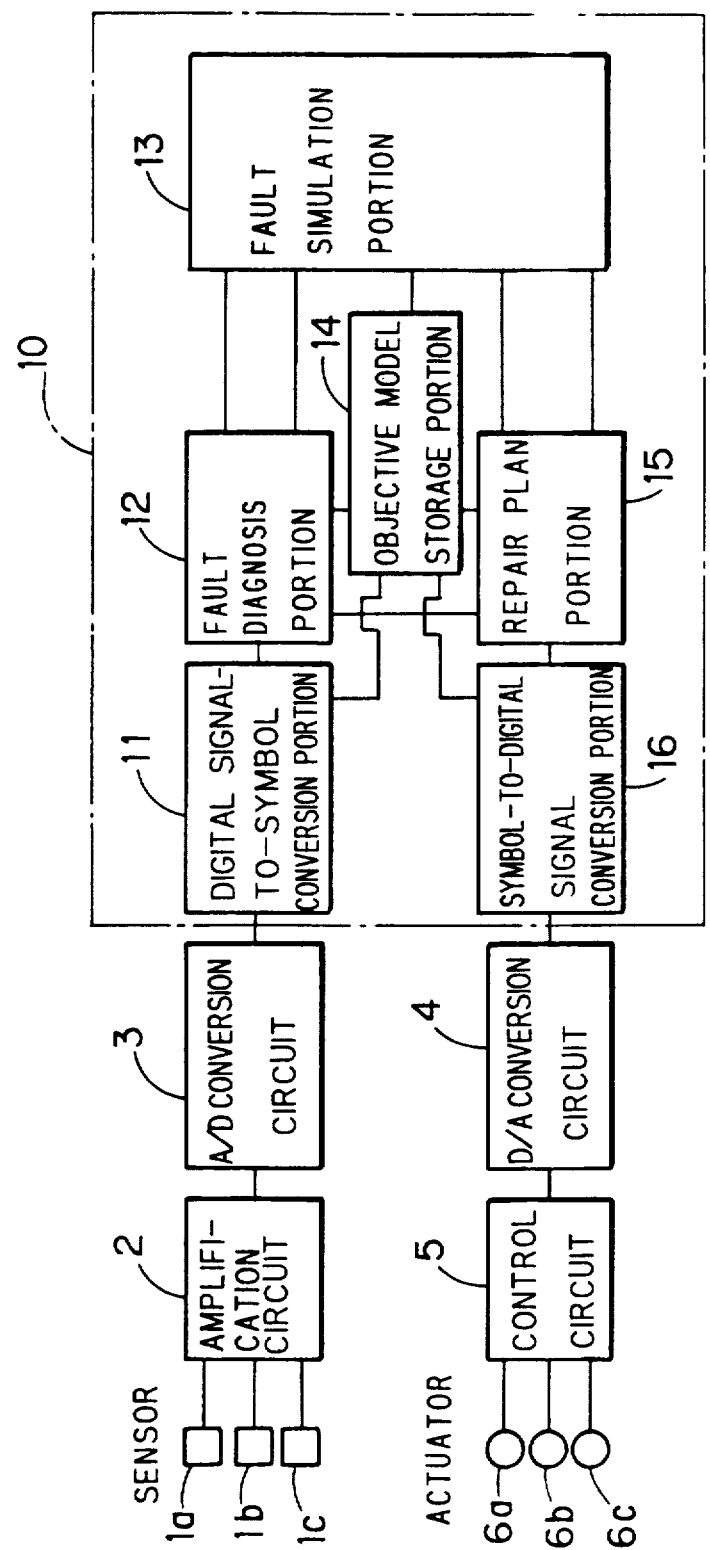
FIG. 1 is a block diagram showing the construction of a system according to an embodiment of the present invention.

FIG. 1 is a block diagram showing the construction of a system according to an embodiment of the present invention. This system comprises a plurality of sensors 1a, 1b and 1c installed on an objective machine and a plurality of actuators 6a, 6b and 6c for changing function states or the like of the objective machine.

The plurality of sensors 1a, 1b and 1c are respectively used for detecting change in elements of the objective machine or relevant states among the machine elements which occurs during the operation of the objective machine. Information signals which are taken in from the plurality of sensors 1a, 1b and 1c, respectively, are amplified by an amplification circuit 2, converted from analogue signals to digital signals by an A/D conversion circuit 3, and applied to a system control circuit 10.

The system control circuit 10 comprises a digital signal-to symbol conversion portion 11, a fault diagnosis portion 12, a fault simulation portion 13, an objective model storage portion 14, a repair plan portion 15 and a symbol-to-digital signal conversion portion 16.

The digital signal-to-symbol conversion portion 11 is used for converting the digital signal applied from the A/D conversion circuit 3 into qualitative information, that is, it has the converting function for converting the digital signal into any one of three symbols, for example, "normal", "high" and "low". The signals applied from the sensors 1a, 1b and 1c are converted into such qualitative information symbolized, thereby to make it easy to make an approach to fault diagnosis. The symbols are not limited to "normal", "high" and "low" in this example. For example, the symbols may be other expressions such as "on" and off" or "A", "B", "C" and "D". When the digital signal is converted into a symbol in the conversion portion 11, characteristic data intrinsic to the objective machine which is stored in the objective model storage portion 14 is referred to. The details of this characteristic data and the signal conversion will be described later.

The fault diagnosis portion 12 and the fault simulation portion 13 constitute a composition portion for judging whether or not a fault exists and making a fault diagnosis by comparing the symbol converted in the digital signal-to-symbol conversion portion 11 with fault diagnosis knowledge stored in the objective model storage portion 14 and consequently, representing the fault state of the objective machine by the qualitative information, that is, the symbol and outputting the same.

The repair plan portion 15 constitutes a composition portion for inferring a repair plan for repairing, if a fault exists, the fault and deriving repair work. In inferring the repair plan and deriving the repair work, qualitative data as described in detail later) which is stored in the objective model storage portion 14 is made use of.

Meanwhile, the methods of making the fault diagnosis, making the fault simulation, inferring the repair plan and deriving the repair work in the fault diagnosis portion 1, the fault simulation portion 13 and the repair plan portion 15 will be described in detail later.

The repair work outputted from the repair plan portion 15 is converted into a digital signal in the symbol-to-digital signal conversion portion 16 by referring to the information stored in the objective model storage portion 14.

The digital signal is converted into an analogue signal in a D/A conversion portion 4 and applied to an actuator control circuit 5. The actuator control circuit 5 selectively operates the plurality of actuators 6a, 6b and 6c to perform repair work on the basis of the analogue signal applied, that is, an actuator control instruction.

Figure 2:
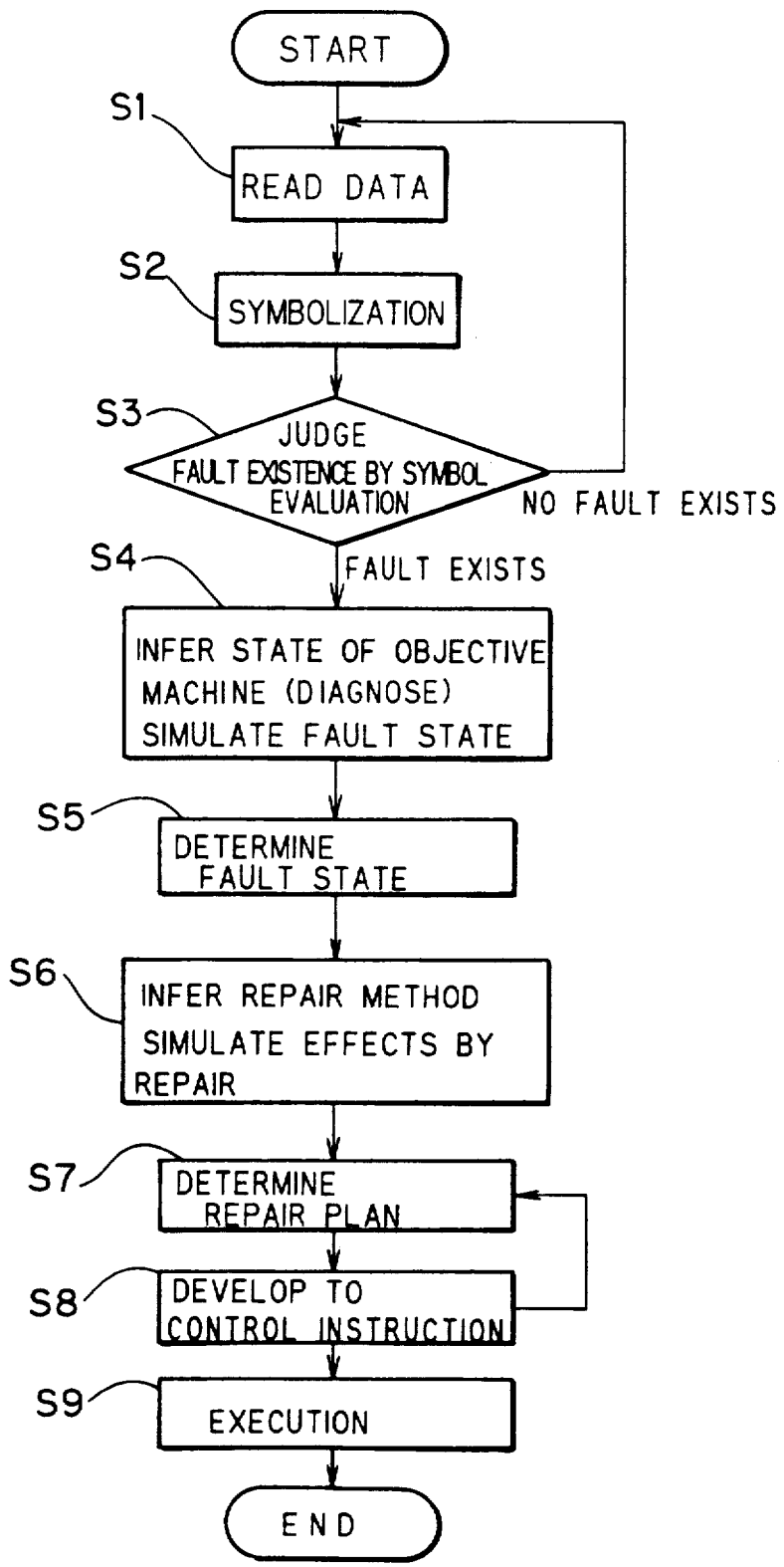
FIG. 2 is a flow chart showing an operation of a control circuit shown in FIG. 1.

FIG. 2 is a flow chart showing the processing of the system control circuit 10 shown in FIG. 1. Referring now to FIG. 2, the outline of the processing of the system control circuit 10 shown in FIG. 1 will be described.

A detection signal from the sensor 1a, 1b or 1c is amplified and converted into a digital signal, to be read in the system control circuit 10 for each predetermined read cycle, for example (step S1).

The digital signal read is symbolized in the digital signal-to-symbol conversion portion 11 (step S2). This symbolization is achieved on the basis of the characteristic data, that is, reference value data intrinsic to the objective machine which is previously set in the objective model storage portion 14. For example, the output ranges of the respective sensors 1a, 1b and 1c are set as follows as the reference value data intrinsic to the objective machine in the objective model storage portion 14.

That is:

sensor 1a:
output of less than $ka_1$ = low
output of $ka_1$ to $ka_2$ = normal
output of more than $ka_2$ = high
sensor 1b:
output of less than $kb_1$ = low
output of $kb_1$ to $kb_2$ = normal
output of more than $kb_2$ = high
sensor 1c: output of less than $kc_1$ = low
output of $kc_1$ to $kc_2$ = normal
output of more than $kc_2$ = high In the digital-to-symbol conversion portion 11, each of the digital signals from the sensors 1a to 1c is converted into a symbol, for example, "low", "normal" or "high" on the basis of the reference value data intrinsic to the above described objective machine which is set in the objective model storage portion 14.

Then, the symbol obtained by the conversion is evaluated in the fault diagnosis portion 12, to judge whether or not a fault exists and specify the fault symptom (step S3). Fault diagnosis knowledge stored in the objective model storage portion 14 is made use of so as to judge whether or not a fault exists and specify the fault symptom by the evaluation of the symbol. The fault diagnosis knowledge is, for example, a set condition that a particular parameter must be, for example, "normal". If the particular parameter is not "normal", it is judged that a fault exists and the fault symptom is specified depending on what the particular parameter is. If no fault exists, the routine of the steps S1, S2 and S3 is repeated.

If it is judged in the step S3 that a fault exists, inference of the state of the objective machine is drawn, that is, fault diagnosis and simulation of the fault state are made (step S4). More specifically, a parameter which causes a fault is retrieved in the fault diagnosis portion 12 on the basis of qualitative data qualitatively representing behaviors or attributes of respective elements constituting an apparatus and the combinational relationship between the elements which are stored in the objective model storage portion 14, and simulation of the fault state is made in the fault simulation portion 13 on the assumption that the parameter retrieved is the fault. Further, in the fault diagnosis portion 12, the result of the simulation is compared with the present value of the parameter, and the justification of the assumption that the parameter retrieved is the fault is judged. The foregoing processing is performed with respect to a plurality of parameters to be retrieved.

As the results of the judgement whether or not a fault exists, the fault diagnosis and the simulation of the fault state, the fault symptom and the fault of the objective machine are determined (step S5). The fault symptom means the change in output condition or the like of the objective machine (for example, "lightly printed copy" or the like in a paper copier taken as an example), and the fault means the change in mechanism and structure of the objective machine which causes the change of the symbol for example, "decrease in halogen lamp quantity of light" in a paper copier taken as an example).

Then, inference of the repair method is drawn by the repair plan portion 15. In drawing this inference, simulation of effects by repair is simultaneously made (step S6).

Then, the repair plan is determined (step S7), and a control instruction is developed on the basis of the repair plan determined (step S8). At the time of development to an actual control instruction, characteristic data intrinsic to the apparatus such as a limit count for an actuator operation is read out from the objective model storage portion 14 and made use of. The control instruction developed is converted into an analog signal and applied to the actuator control circuit 5, thus carrying out repair control (step S9). Then, the control is terminated.

An inference method for the fault diagnosis and the repair plan will be described in detail with reference to a concrete example. In the following, the method taking the peripheral portion of a photosensitive drum in a small-sized plain paper copier as an objective machine will be described by way of example.

DESCRIPTION TAKING SPECIFIC OBJECTIVE MACHINE AS EXAMPLE

Construction and State of Objective Machine

Figure 3:
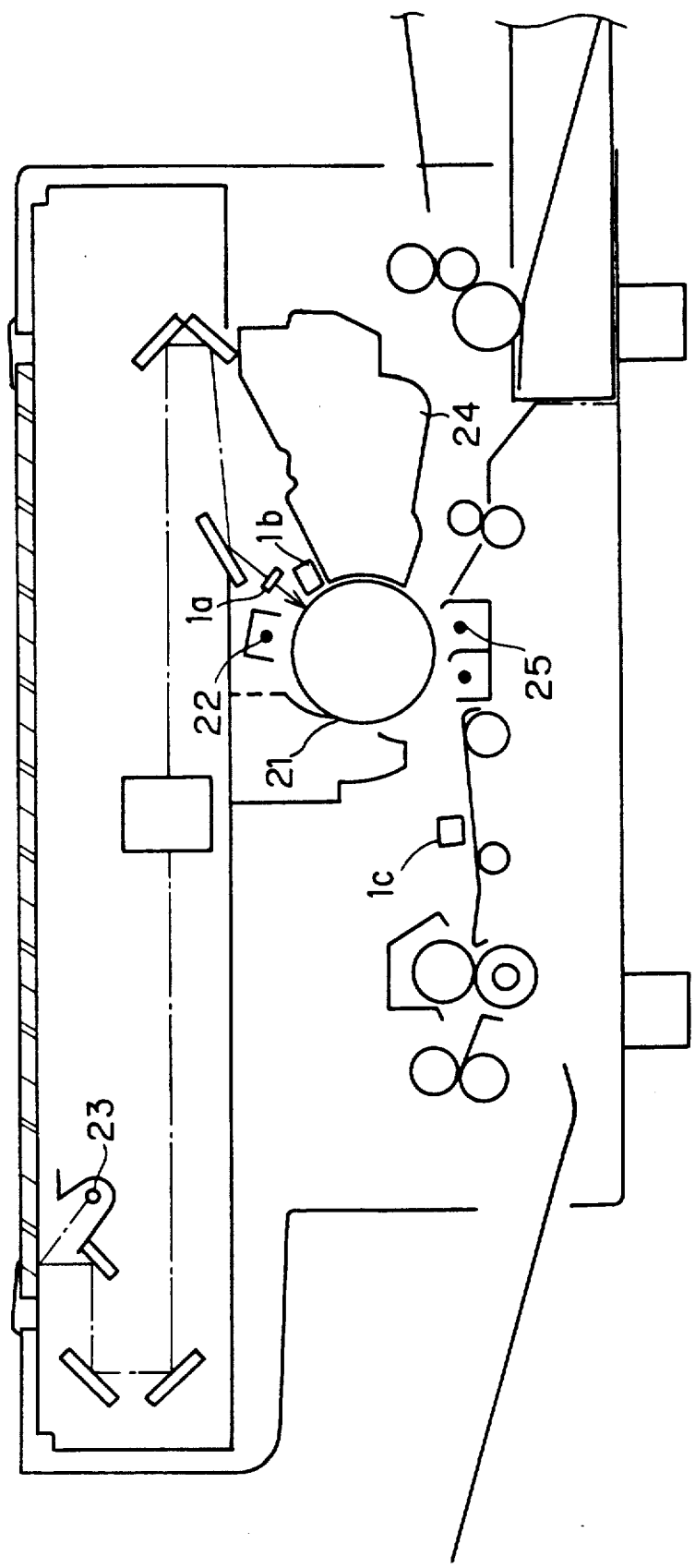
FIG. 3 is a diagram showing the schematic construction of the present invention which is applied to a plain paper copier.

FIG. 3 is an illustration showing a specific objective machine. In FIG. 3, reference numeral 21 designates a photosensitive drum, 22 designates a principal electro static charger, 23 designates a halogen lamp for copy illumination, 24 designates a developing device, and 25 designates a transfer charger.

In the present embodiment, three sensors 1a, 1b and 1c are provided, for example. That is, the sensor 1a is an AE sensor for measuring the quantity of light incident on the photosensitive drum, the sensor 1b is a surface potential sensor for measuring a surface potential of the photosensitive drum, and the sensor 1c is a densitometer for measuring the density of a picture image copied on paper.

Furthermore, three types of actuators are provided, which are not shown in FIG. 3. That is, three volumes. that is, a principal charge volume VR1 for changing a principal charge voltage of the photosensitive drum, a lamp volume AVR for controlling the quantity of light of the halogen lamp, and a transfer volume VR2 for controlling a transfer voltage between the photosensitive drum and copy paper are provided as the actuators.

Meanwhile, when the objective machine shown in FIG. 3 is looked at from a physical point of view, the objective machine is expressed as a combination of a plurality of elements on a substance level, and behaviors and attributes of the respective elements as well as the combinational relationship among the respective elements are expressed qualitatively using parameters as shown in Table 1. The expression form as shown in Table 1 will be referred to as a "substance model".

Figure 4:
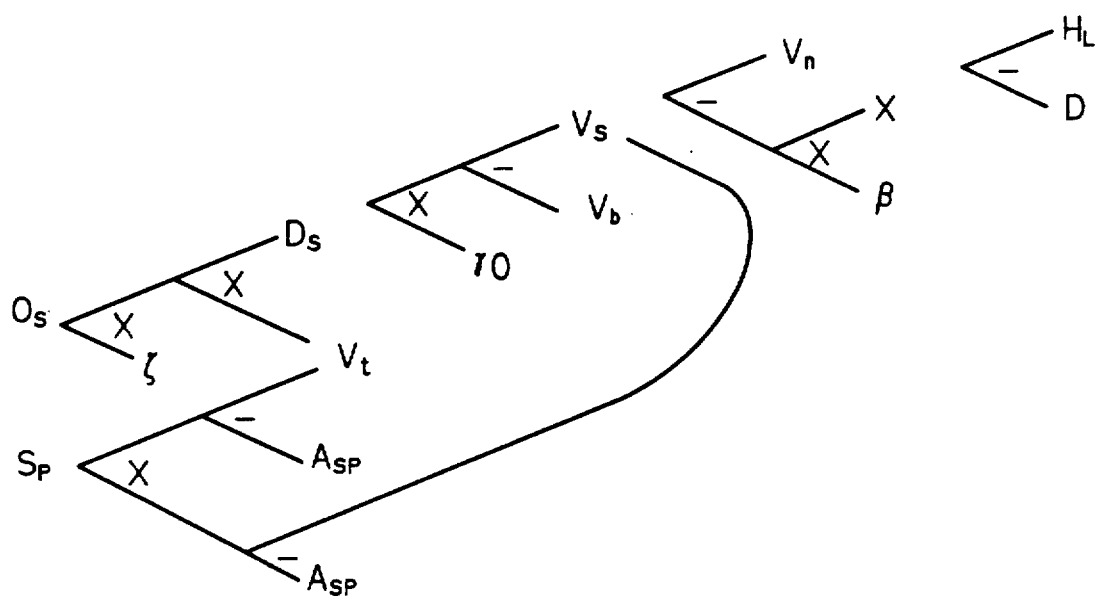
FIG. 4 is a diagram showing a mathematical model in the present embodiment.

Furthermore, the expression of FIG. 4 in which the substance model is abstracted and shown as a combined tree of the respective parameters will be referred to as a "mathematical model".

Additionally, the "substance model" and the "mathematical model" are referred to as an "objective model" collectively. The "objective model" is qualitative data common to image forming apparatuses which is also made use of for fault repair as described later.

TABLE 1

"Substance Model"

Exposure portion: $X = H_L - D$
X: logarithm of copy reflected quantity of light
$H_L$: logarithm of halogen lamp output quantity of light
D: optical density of copy
Photosensitive portion: $V_s = V_n - \beta X$
$V_s$: surface potential after exposure
$V_n$: surface potential after principal charge
$\beta$: sensitivity of photosensitive substance
Development portion: $D_s = \gamma_0(V_s - V_b)$
$D_s$: toner density on drum
$\gamma_0$: toner sensitivity
$V_b$: bias voltage
Output portion: $O_s = \zeta \cdot V_t \cdot D_s$
$O_s$: toner density on output paper
$\zeta$: sensitivity of paper
$V_t$: transfer voltage
Separation portion: $S_p = (V_t - A_{sp}) \cdot (V_s - A_{sp})$
$S_p$: adsorbing force between drum and paper
$A_{sp}$: amplitude of separating AC voltage The respective contents of the substance model and the mathematical model which serve as qualitative data are stored in the objective model storage portion 14.

Furthermore, in the objective model storage portion 14, reference value data which are measured in plant shipment, for example, are stored with respect to a predetermined parameter out of parameters included in the substance model. This reference value data is characteristic data intrinsic to this image forming apparatus.

Figure 5:
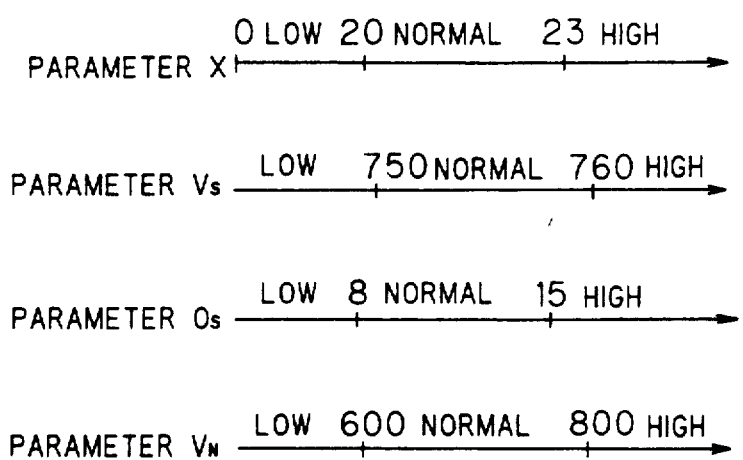
FIG. 5 is a diagram showing reference value data of respective parameters required to symbolize the respective parameters.

For example, in this machine, reference value data specifying the ranges of "low", "normal" and "high" are stored with respect to parameters X, $V_s$, $O_s$ and $V_n$, respectively, as shown in FIG. 5.

Meanwhile, in the present embodiment, the above described reference value data can be renewed in response to sensing data in the process of the later fault diagnosis and fault repair, the change in operating state of the objective machine and the like.

Additionally, function evaluation knowledge used as an example of the fault diagnosis knowledge to be a basis for judging whether or not the objective machine is normally operated is stored in the objective model storage portion 14 on the basis of the symbol converted.

Meanwhile, the function evaluation knowledge, that is, the fault diagnosis knowledge may be one which is intrinsic to the objective machine or may be one which is not intrinsic thereto but is widely common to image forming apparatuses.

The function evaluation knowledge includes the following knowledge:

| | |
|---|---|
| picture image density | $O_s$ = normal |
| fog degree | $O_s'$ < normal |
| separation performance | $S_p$ < normal |

Here, when $O_s$, $O_s'$ and $S_p$ do not meet the above described conditions, the objective machine is not normally operated.

Let's consider a case where digitalized sensor information of the objective machine in a normal operation takes the following values:

AE sensor value $X = 30$ surface potential sensor value $V_s = 300$ densitometer value $O_s = 10$ Furthermore, it is defined that:

densitometer value $O_s$ = fog degree $O_s'$ in a case where a blank original at optical density $D = 0$ is used, and surface potential sensor value $V_s$ = dark potential $V_n$ in a state where the halogen lamp is put off, and it is assumed that there values were:

fog degree $O_s' = 50$ dark potential $V_n = 700$

Meanwhile, measurements of the fog degree $O_s'$ and the dark potential $V_n$ may be made through a manual operation, or may be programmed so as to be made automatically under constant conditions, for example, whenever the power supply of the objective machine is turned on or before copying is started. In the present embodiment, the latter is adopted.

The values X, $V_s$, $O_s$, $O_s'$ and $V_n$ obtained by the AE sensor 1a, the surface potential sensor 1b and the densitometer 1c are respectively converted into symbols in the digital signal-to-symbol conversion portion 11.

As described in the foregoing, the conversion is made in such a manner that the digital value given from the sensor 1a, 1b or 1c is compared with the reference value data serving a characteristic data stored in the objective model storage portion 14 and is converted into any one of three types of symbols, for example, "normal", "high" and "low".

In the present embodiment, respective parameters are symbolized as follows:

X = high $V_s$ = low $O_s$ = low $V_n$ = normal

In the fault diagnosis portion 12, these respective parameters symbolized are compared with the function evaluation knowledge serving as an example of the fault diagnosis knowledge which is stored in the objective model storage portion 14. As a result, since the picture image density $O_s$ is not "normal", it is judged that a fault exists and the fault symptom is "picture image density too low ($O_s$ = low)". Inference in the fault diagnosis, that is, inference of the fault is then drawn with "$O_s$ = low" being the fault symptom.

Fault diagnosis technique

First, fault diagnosis is made in the fault simulation portion 13 using the mathematical model shown in FIG. 4, to retrieve parameters which may cause $O_s$ = low.

Figure 6:
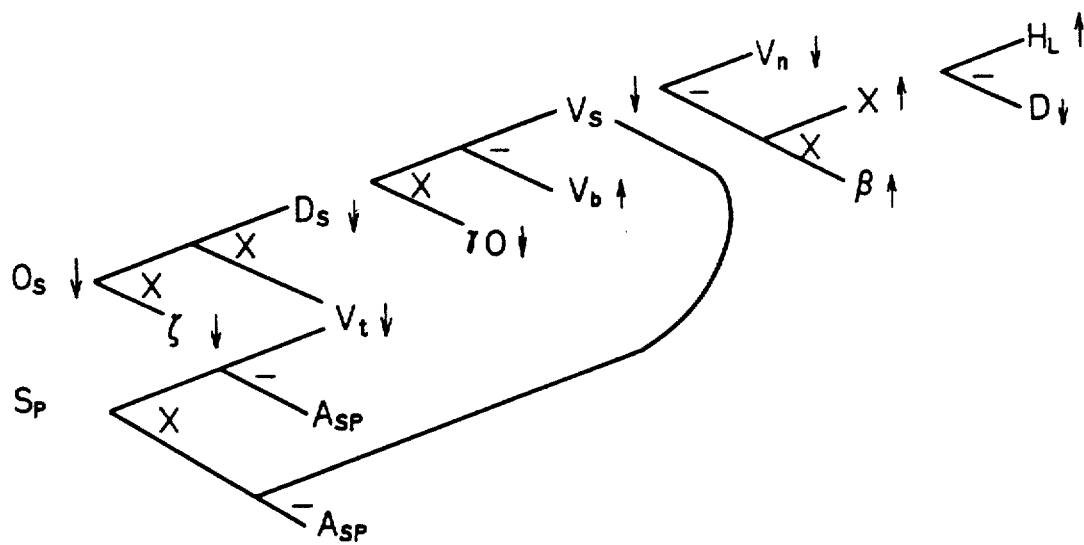
FIGS. 6 and 7 are diagrams showing development on the mathematical model for fault diagnosis.

The parameters which may decrease $O_s$ are pointed out on the mathematical model in FIG. 4, as shown in FIG. 6. In FIG. 6, parameters marked with upward arrows or downward arrows are parameters which may cause $O_s$ = low, the parameters marked with the upward arrows causing $O_s$ = low when they are increased and the parameters marked with the downward arrows causing $O_s$ = low when they are decreased.

Then, the causes of changing parameters are detected in the fault diagnosis portion 12 with respect to parameters $\zeta$, $D_s$, $V_t$, $\gamma_0$, $V_b$, $V_s$, $V_n$, X, $\beta$, $H_L$ and D that might cause $O_s$ = low which have been retrieved on the mathematical model.

This detection is performed on the basis of the substance model shown in Table 1. In the present embodiment, inference of the following fault candidates is drawn. That is:

| | | |
|---|---|---|
| $V_t$ = low: | → | defective transfer transformer |
| $\zeta$ = low: | → | deterioration of paper |
| $V_b$ = high: | → | improper development bias |
| $\gamma_0$ = low: | → | deterioration of toner |
| $V_n$ = low: | → | improper principal charge voltage |
| $H_L$ = high: | → | improper setting of halogen lamp |
| D = low: | → | lightly printed original |

The foregoing knowledge, for example, $V_t$ = low means "defective transfer transformer", $\zeta$ = low means "deterioration of paper", or $V_b$ = high means "improper development bias" is fault cause knowledge. This knowledge is included in qualitative data common to image forming apparatuses.

$\beta$ out of the parameters is excluded because it is the sensitivity of the photosensitive drum and is not increased. $D_s$, $V_s$ and X are also excluded because they are expressed by other parameters.

Simulation of the fault state is made in the fault simulation portion 13 for the above described inference which has been drawn in the fault diagnosis portion 12.

The simulation of the fault state means drawing inference on the states of the objective machine in a case where the faults inferred occur. More specifically, it is assumed that the cause of creating $O_s$ = low, that is, the fault is, for example, "defective transfer transformer", to set $V_t$ = low with respect to the model in a normal state. Then, the effects exerted on respective parameters in such a state are examined on the mathematical model. If $V_t$ = low is set, $O_s$ = low and $S_p$ = low are created and the other parameters are all "normal". Accordingly, this is contradictory to X = high and $V_s$ = low obtained from the sensors. Therefore, such a conclusion is drawn that the inference of the fault is in error.

Similarly, $\zeta$ = low is set on the mathematical model in the normal state and the result thereof is compared with the symbol obtained from the sensor. Also in this case, a contradiction is found because X = normal on the mathematical model while the symbol from the sensor is X = high. Accordingly, it is judged that the inference of the fault is in error.

Simulation of the fault states is thus made with respect to all the fault candidates, to confirm whether or not the inference of the fault is right.

As a result, in the present embodiment, such a conclusion is drawn that the result which coincides with the actual state of the objective machine is obtained if the fault is "improper setting of halogen lamp $H_L$ = high)" and the other fault candidates are all contradictory to the actual state of the machine.

Accordingly, it is possible to conclude that the fault in this case is "improper setting of halogen lamp". The states of the respective parameters of the objective machine at that time are as shown in Table 2.

TABLE 2

| Improper Setting of Halogen Lamp | | |
|---|---|---|
| $H_L$ = high | $V_b$ = normal | $A_{sp}$ = normal |
| D = normal | $\gamma_O$ = normal | $S_p$ = low |
| X = high | $D_s$ = low | |
| $\beta$ = normal | $V_t$ = normal | |
| $V_n$ = normal | $\zeta$ = normal | |
| $V_s$ = low | $O_s$ = low | |

Figure 7:
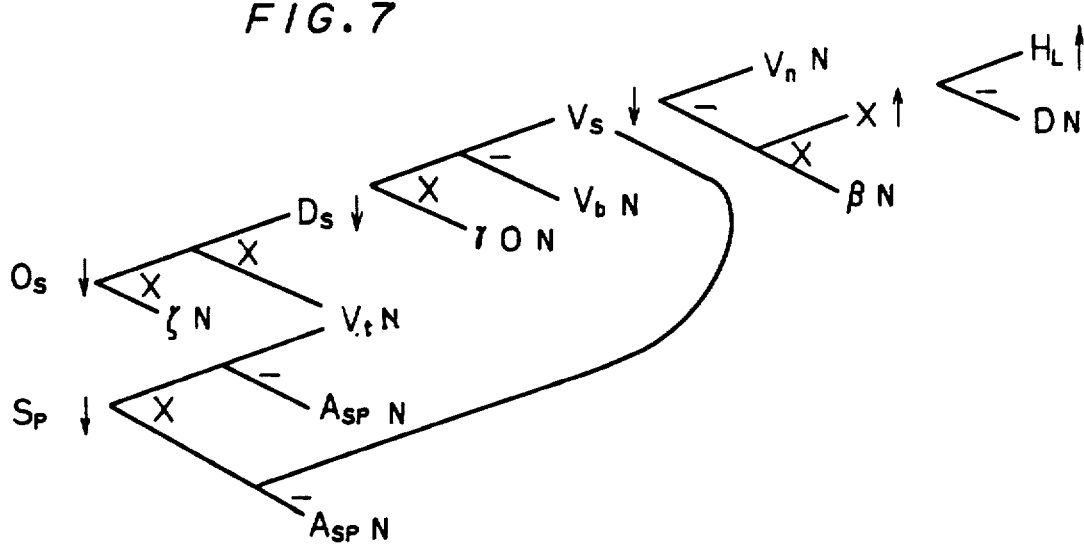

FIG. 7 is obtained when the states of the parameters shown in Table 2 are traced on the mathematical model. In FIG. 7, a downward arrow, an upward arrow and N which are marked on the right side of each of the parameters respectively indicate "low", "high" and "normal".

Inference in Repair plan

Inference in the repair plan will be described.

As the result of the distinction between faults, "picture image density too low ($O_s$=low)" is taken up as the fault symptom. Accordingly, the target of repair is to increase $O_s$.

Inference can be drawn from the relationship on the mathematical model shown in FIG. 4 that $O_s$ can be increased, which is the target of repair, by increasing $D_s$, by increasing $V_t$ or by increasing $\zeta$.

Then, when inference is drawn with increasing $D_s$ as the target, any one of such conclusions is obtained that $V_s$ is increased, $V_b$ is decreased and $\gamma_O$ is increased. It is thus possible to obtain on the mathematical model the candidates of the repair operation by repeating the inference on the basis of the mathematical model. The obtained results are shown in Table 3.

TABLE 3

| $H_L$ = decrease | $V_b$ = decrease |
|---|---|
| D = increase | $\gamma_O$ = increase |
| X = decrease | $D_s$ = increase |
| $\beta$ = decrease | $V_t$ = increase |
| $V_n$ = increase | $\zeta$ = increase |
| Vs = increase | |

Now, some repair candidates obtained on the basis of the mathematical model may be realized, whereas others may not be realized. For example, D: Optical density of original cannot be altered, and
$\beta$: Sensitivity of a photosensitive substance is also difficult to be altered.
$\gamma_O$: Sensitivity of toner is neither alterable, and
$\zeta$: Sensitivity of paper is nor alterable.

Furthermore, in this concrete example, $V_b$: Bias voltage is not alterable because there is no actuator. It is needless to say that $V_b$ is alterable by adding an actuator.

Additionally, the following are not made alterable but are only altered by indirectly altering another parameter and thus, are excluded from the repair candidates:

X: logarithm of copy reflected quantity of light
$V_s$: surface potential of drum after exposure
$D_s$: toner density on drum Meanwhile, the following, which is not directly related in this concrete example, can be altered by adding an actuator:

$A_{sp}$: amplitude of separating AC voltage

In the above described manner, the following are taken up as the repair candidates in this concrete example:

$V_t$: transfer voltage
$V_n$: surface potential after principal charge
$H_L$: logarithm of halogen lamp output quantity of light On the other hand, the following knowledge is previously stored as the repair plan knowledge in the objective model storage portion 14. That is:

| (a) $V_t$ is increased. | → | The control voltage of the transfer transformer is increased. |
|---|---|---|
| (b) $V_t$ is decreased. | → | The control voltage of the transfer transformer is decreased. |
| (c) $V_n$ is increased. | → | The control voltage of the principal charge transformer is increased. |
| (d) $V_n$ is decreased. | → | The control voltage of the principal charge transformer is decreased. |
| (e) $H_L$ is increased. | → | The halogen lamp control signal is shifted to the high voltage side. |
| (f) $H_L$ is decreased. | → | The halogen lamp control signal is shifted to the low voltage side. |

The repair plan knowledge stored in this objective model storage portion 14 is characteristic data intrinsic to this apparatus. By applying the repair plan knowledge to the repair candidates obtained on the basis of the mathematical model, the following three methods are obtained as the repair operation for increasing $O_s$:

| (a) $V_t$ is increased. | → | The control voltage of the transfer transformer is increased. |
|---|---|---|
| (b) $V_n$ is increased. | → | The control voltage of the charge transformer is increased. |
| (c) $H_L$ is decreased. | → | The halogen lamp control signal is shifted to the low voltage side. |

If it is necessary only to increase the picture image density $O_s$, repair is possible by carrying out any one of the three methods.

It is considered, however, that the objective machine is subjected to a variety of secondary effects by increasing the picture image density $O_s$. In the present embodiment, therefore, inference of the secondary effects is drawn on the basis of the mathematical model as described below.

Inference of secondary effects

Figure 8:
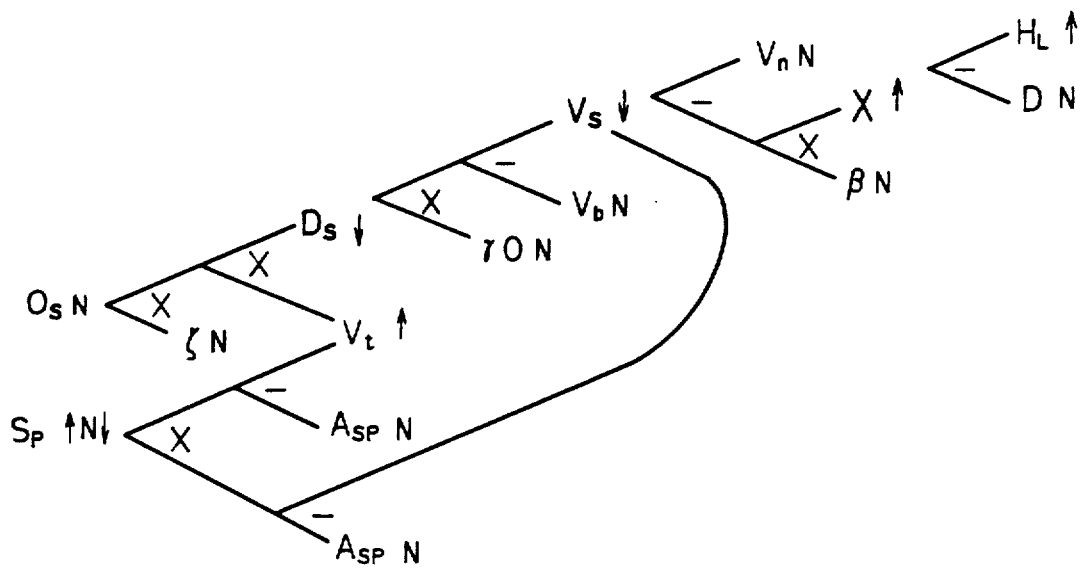
FIGS. 8 to 13 are diagrams showing development on the mathematical model for inference of secondary effects.
Figure 9:
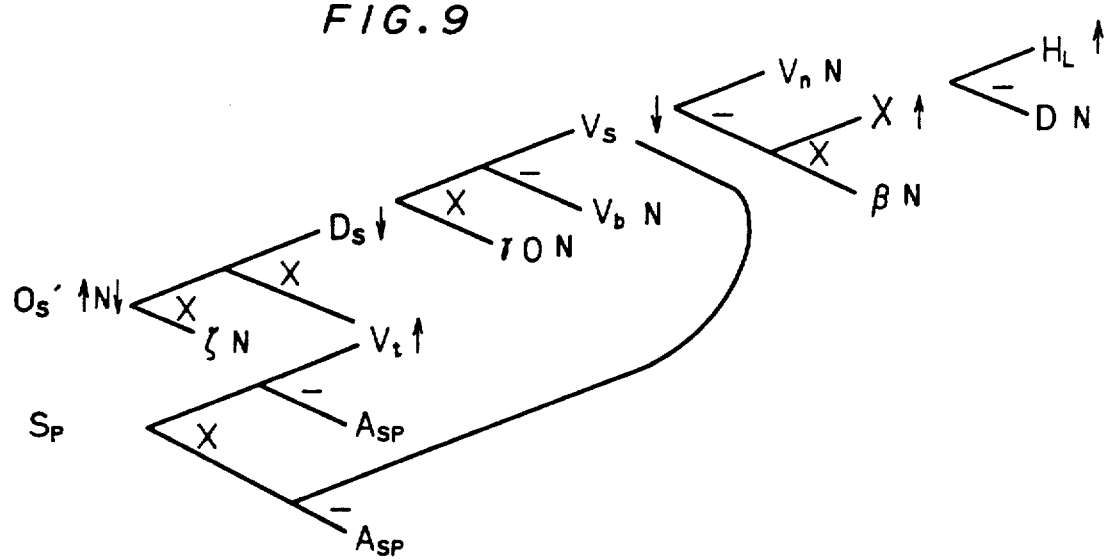
Figure 10:
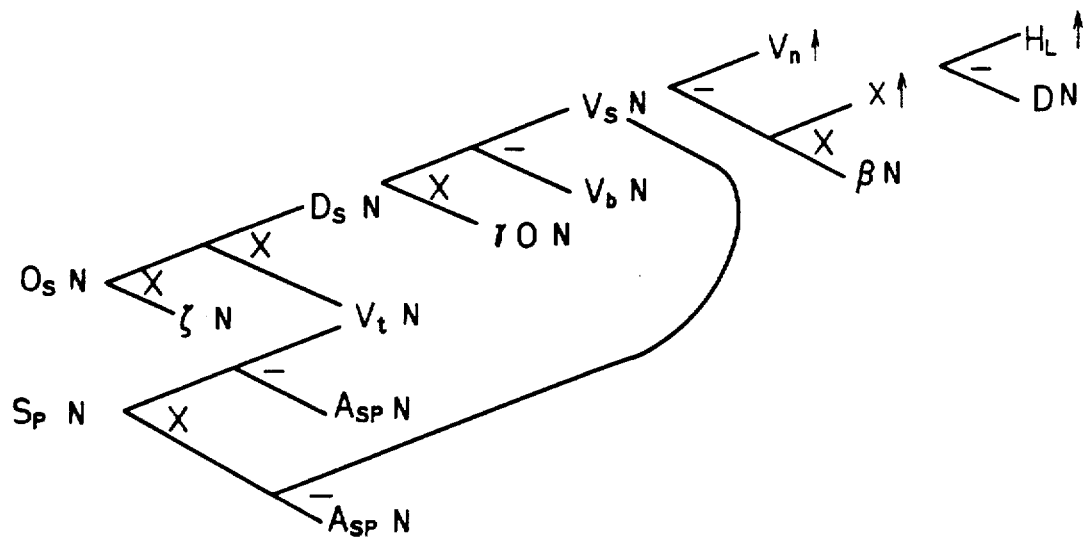
Figure 11:
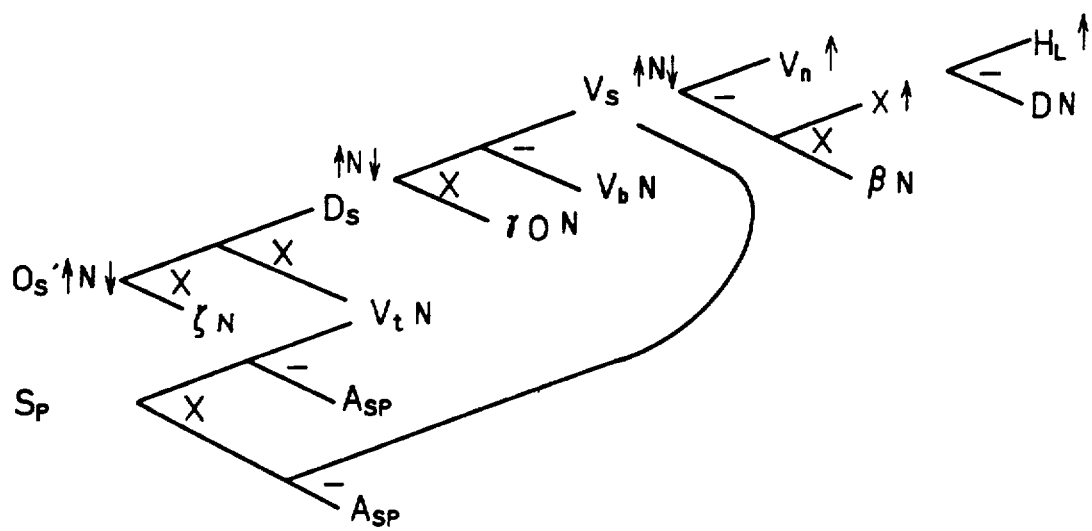
Figure 12:
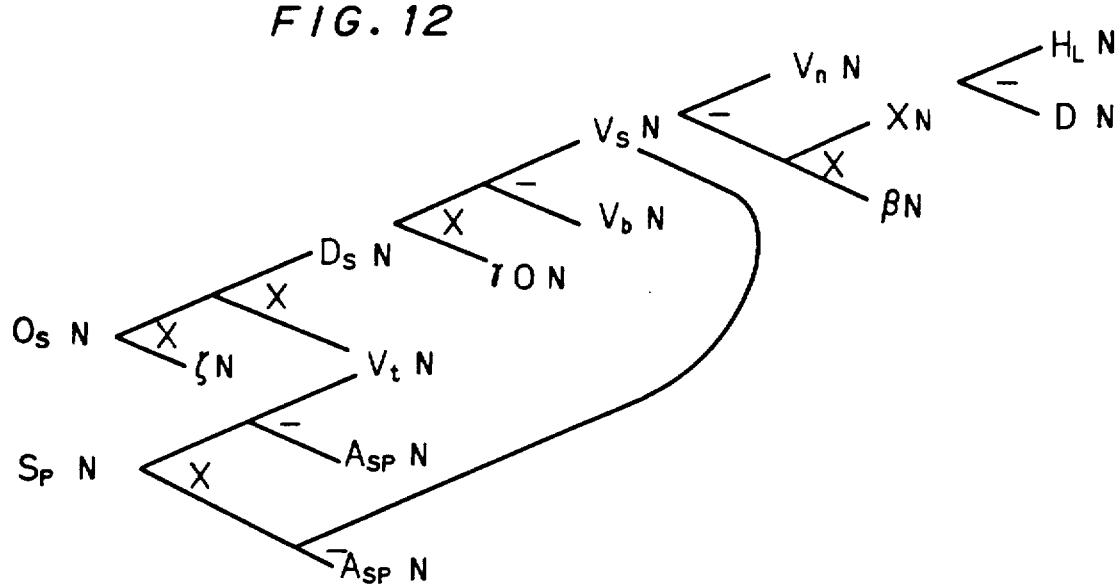
Figure 13:
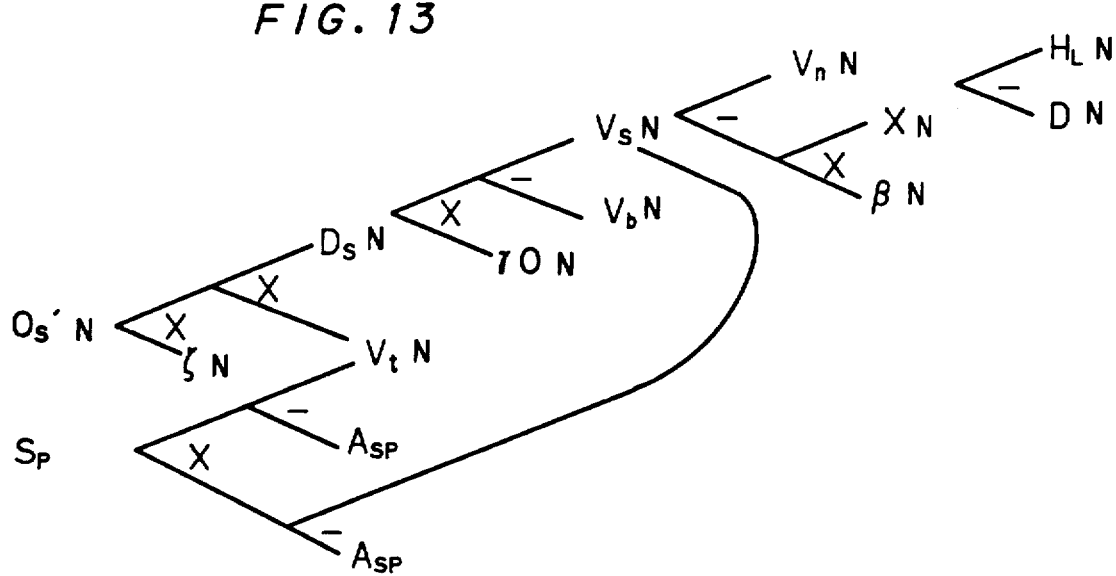

FIGS. 8 to 13 are obtained when three repair plans derived in the inference in the repair plan are developed on the mathematical models. That is, the case (a) where $V_t$ is increased is shown in FIGS. 8 and 9 ($O_s'$ when D=0 is shown on the mathematical model in FIG. 9), and the case (c) where $V_n$ is increased is shown in FIGS. 10 and 11 ($O_s'$ when D=0 is shown on the mathematical model in FIG. 11), and a case (f) where $H_L$ is decreased is shown in FIGS. 12 and 13 ($O_s'$ when D=0 is shown on the mathematical model in FIG. 13).

When function evaluations are carried out on the basis of the mathematical models, inference is drawn on the following states. That is;

(1) When $V_t$ is increased (FIGS. 8 and 9)
 (a) The output picture image density is increased.
 (b) In some cases, $O_s'$>normal is created when D=0. That is, there is a possibility that fog is generated.
 (c) There is a possibility that $S_p$>normal is created and defective separation is performed.

(2) When $V_n$ is increased (FIGS. 10 and 11).
 (a) The output picture image density is increased.

(b) $O_s' >$ normal is created when $D=0$, and there is a possibility that fog is generated.

(3) When $H_L$ is decreased (FIGS. 12 and 13)

(a) The output picture image density is only increased, and there is no other secondary effects.

Therefore, in the repair plan portion 15, the repair plan which is subjected to the least secondary effects, that is, to decrease $H_L$ is selected. This repair plan coincides with an operation for eliminating a fault obtained in fault diagnosis.

More specifically, from another point of view, inference of the fault in the fault diagnosis is drawn by tracing on the mathematical model the actual state of the apparatus which failed and grasping the states of respective elements in a case where the apparatus failed, while inference in the repair plan is drawn by tracing on the mathematical model the state of the apparatus on the assumption that the apparatus is not undergoing a fault but normal.

In the above described concrete example, both the inference in the fault diagnosis and the inference in the repair plan result in the same fault and repair plan.

However, the results obtained by both the inference in the fault diagnosis and the inference in the repair plan may, in some cases, differ from each other because the former is based on the assumption that the apparatus is in the fault state, while the latter is based on the assumption that the apparatus is in the normal state. In such cases, only a conclusion which is not contradictory to the conclusion obtained in the process of the inference in the fault diagnosis may be selected at the time of the inference in the repair plan to perform the inference processing in the repair plan in a shorter time period.

In the above described case, when the repair plan to decrease $V_n$ cannot be selected, for example, when the volume AVR for shifting the halogen lamp control signal to the low voltage side is already at the lowest limit, the repair plan (2) which is subjected to the next least secondary effects, that is, to increase $V_n$ is selected.

If the repair plan to increase $V_n$ is selected, however, a secondary effect of the possibility of fog generation is forecast. Accordingly, if is examined on the basis of the mathematical model shown in FIG. 11 which parameter is to be operated so as to decrease $O_s$, and an operation is selected on the basis of the repair plan knowledge. As a result, the following is selected:

whether $H_L$ is increased, whether $V_n$ is decreased, or whether $V_t$ is decreased, and a repair plan including prevention of fog generation is carried out.

Figure 14:
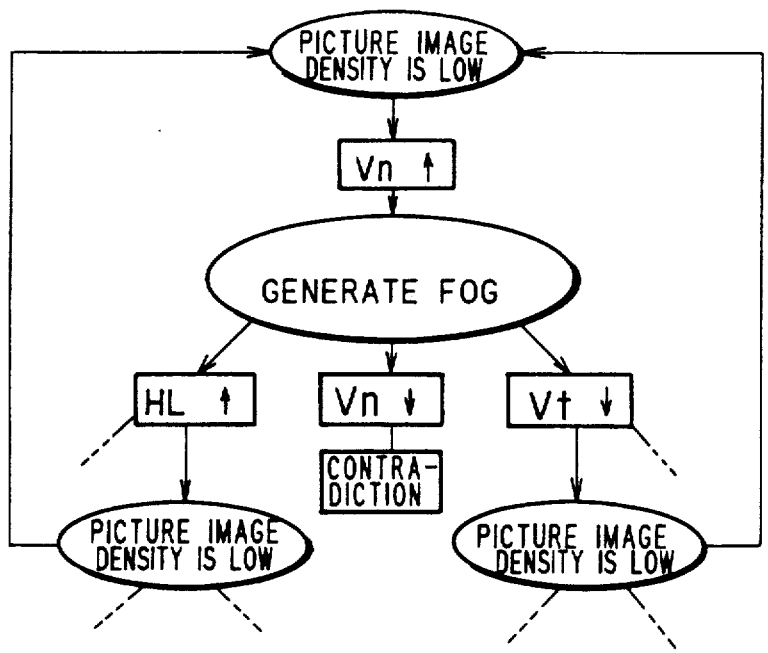
FIG. 14 is a diagram showing an operation in selecting repair plans.

More specifically, inference of a repair operation is developed by assuming secondary effects as shown in FIG. 14. The development of the inference of the repair operation as shown in FIG. 14 is made on the basis of the following knowledge:

(a) Any branch which is contradictory to the previous repair plan on the mathematical model is not selected.

(b) That which is subjected to the least secondary effects is selected.

(c) That which has formed a loop stops being developed at that time point.

Figure 15:
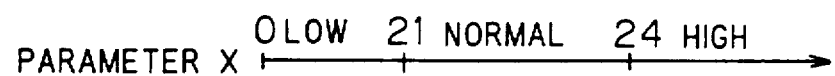
FIG. 15 is a diagram showing reference value data after renewal.
Figure 15:
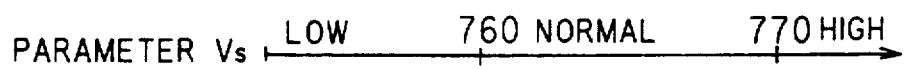
Figure 15:
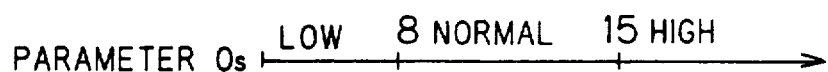
Figure 15:
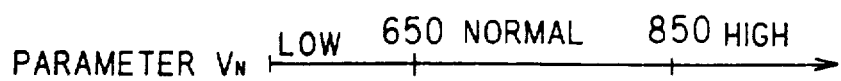

In FIG. 15, the following two repair plans are eventually left:

(1) a loop of $V_n \uparrow \rightarrow H_L \uparrow \rightarrow V_n \uparrow$, and (2) a loop of $V_n \uparrow \rightarrow V_t \uparrow \rightarrow V_n \uparrow$ In a case where the loop (1) is executed as a repair plan, it is assumed that the picture image density becomes proper, that is, $O_s$ becomes "normal". In such a case, parameters $V_n$ and $H_L$ are increased. Accordingly, in a state after repair where the picture image density $O_s$ is returned to "normal", the value of the surface potential measured by the sensor 1b should be changed to a value significantly higher that the value first measured. Since this means that the repair work succeeded, however, a parameter $V_s$ in a state after repair must be symbolized to "normal". In such a case, therefore, reference data for symbolizing the parameter $V_s$ shown in FIG. 5 is altered on the basis of the value measured by the sensor 1b at the time point where the repar is terminated, and is reloaded with data shown in, for example, FIG. 15.

Thus, the reference data is renewed as required after the repair work is terminated.

In the present embodiment, when the above described loop (1) in FIG. 14 is executed, and specifically, the principal charge volume VR1 is operated to raise the surface potential of the photosensitive drum 21 so that fog is generated in a copy thus obtained, the lamp volume AVR is operated to increase the quantity of light of the halogen lamp so that the picture image density of the copy is decreased.

When the picture image density becomes normal, that is, when it is found from a detection output of the densitometer which is the sensor 1c that the parameter $O_s$ becomes "normal" while alternately increasing the principal charge volume VR1 and the lamp volume AVR, the repair processing is terminated.

Furthermore, if the above described two repair plans are impractical, the above described repair plan (3) to increase $V_t$ is further selected, and fault diagnosis assuming fog generation and defective separation which are the secondary effects is made, thus selecting the repair plan.

Then, if the selected repair plan is carried out, and in the case of loop processing, judgement is made to be a failure when the operation of parameters on the loop reaches its limit.

Additionally, in the present embodiment, the termination of the repair is determined when $O_s$ becomes "normal", and the repair is stopped in that state.

In the above described inference of the secondary effects, three repair plans derived in the inference in the repair plan are sequentially developed on the mathematical model. The inference of the secondary effects is drawn with respect to the respective three repair plans collectively.

Such an inference method of the secondary effects may be replaced with the following processing.

More specifically, in the inference in the repair plan, it is assumed that three repair plans, for example, are derived. In such a case, only one of the three repair plans is taken up to simulate a secondary effect which may be caused when an actuator means is operated on the basis of the repair plan, and it is judged whether or not the secondary effect simulated can be removed by operating actuator means other than the an actuator means selected by the repair plan.

When it is judged that the secondary effect can be removed, the actuator means selected by the repair plan is actually operated to make a repair, and the secondary effect is removed by operating the other actuator means.

As a result, secondary effects based on the other two repair plans derived in the repair plan need not be simulated, thereby to make it possible to shorten the time for the repair operation as a whole.

In the above described case, if the secondary effect is simulated with respect to the repair plan first selected and it is judged that the secondary effect simulated cannot be removed by operating the other actuator means, the first repair plan is abandoned and then, the second repair plan is taken up to simulate a secondary effect which may be caused when actuator means selected on the basis of the second repair plan is operated, and it is judged whether or not the secondary effect simulated can be removed by operating actuator means other than the actuator means. When the secondary effect can be removed, repair work based on the second repair plan is performed.

Thus, a first repair plan out of a plurality of repair plans derived in the inference in the repair plan is taken out, and inference of a secondary effect in the case is drawn. If the secondary effect can be removed, repair based on the first repair plan is immediately made.

If the secondary effect is too large in the repair plan, the repair plan is abandoned, and he next repair plan is selected to simulate a secondary effect in the case.

In such a case, it is preferable to judge which repair plan is to be first selected out of the plurality of repair plans derived in the inference in the repair plan in consideration of, for example, the fault obtained in the fault diagnosis.

In the above described embodiment, repair itself is significantly restricted because the number of parameters of an actuator is small. However, it is possible to further improve the flexibility and the possibility of the repair by increasing the number of parameters of the actuator.

In the above described concrete example, if any repair work succeeded, it is judged that the apparatus after success is in a normal state. Accordingly, it is preferable that reference value data (a reference value shown in FIG. 5) of each parameter is renewed by the value of digital data applied from each sense and the parameter is symbolized on the basis of new reference value data.

Furthermore, in the above described concrete example, the operation range of each actuator is not particularly referred to. However, the operation range in which an output state of an actuator is stored can be utilized for judgement whether or not repair work is right, provided that operation range data for setting the operation range of the actuator is included in characteristic data intrinsic to the apparatus which is stored in the objective model storage portion 14. More specifically, it is judged that the actuator is operable when the actuator is within the operation range, while it is judged that the actuator is not operable when the actuator reaches the upper or lower limit of the operation range.

Additionally, although in the above described concrete example, a system of automatically making self-diagnosis and self-repair on the basis of the change of the sensor output is taken up, the image forming apparatus may be provided with a self-diagnosis mode setting key or the like such that self-diagnosis and/or self-repair can be made only when the self-diagnosis mode setting key is operated.

In the foregoing concrete example, description was made by taking up a completely autonomous system, that is, a system of automatically making self-diagnosis of the presence or absence of a fault and making self-repair if a fault exists without any operation of a serviceman and a user. According to the present invention, however, an image forming apparatus capable of making non-autonomous self-diagnosis and making autonomous repair on the basis of the self-diagnosis can be provided by using such a construction that data input means is provided instead of eliminating sensors from elements of the apparatus so that a serviceman or the like can measure data in a function state in predetermined portions of the apparatus and input the same from the data input means.

Furthermore, an image forming apparatus having a non-autonomous repair system can be provided by using such a construction that an actuator for repairing a fault is only selected on he basis of the results of self-diagnosis made by the apparatus and the actuator is not actually operated but the actuator to be operated is displayed so that it is only necessary that a serviceman operates the actuator displayed.

It goes without saying that an image forming apparatus having only a self-diagnosis system can be provided by eliminating elements of a self-repair system.

More specifically, according to the present invention, the following image forming apparatus can be constructed as required:

(1) An image forming apparatus having completely autonomous self-diagnosis and self-repair systems, (2) An image forming apparatus having an autonomous self-diagnosis system and a non-autonomous self-repair system, (3) An image forming apparatus having a non-autonomous self-diagnosis system and a non-autonomous self-repair system, (4) An image forming apparatus having a non-autonomous self-diagnosis system and an autonomous self-repair system, or (5) An image forming apparatus having only an autonomous self-diagnosis system.

Furthermore, in the present invention, only an actuator which is actually adjustable may be selected in consideration of the adjustable range of the actuator in making an inference in the repair plan.

More specifically, if an actuator is, for example, an AVR, the AVR is so adapted that its lower limit value and its upper limit value are respectively "0" and "100" and its set state can be detected by any one of the integers 1 to 100. In addition, the lowest limit value "0" and the upper limit value "100" of the AVR are set in the objective model storage portion 14. Consequently, when the AVR is adjusted to enter a certain state, the adjusted state of the AVR is grasped as data of any one of the integers 0 to 100 which corresponds to the adjusted state.

In the repair plan portion 15, the adjusted state of the AVR is grasped by the data of any one of the integers 0 to 100 obtained depending on the adjusted state of the AVR, to judge whether or not the AVR can be selected as an actuator for fault repair. That is, the lower limit value and the upper limit value of the AVR which are stored in the objective model storage portion 14 are compared with the present value of the adjusted state thereof, to judge whether the AVR can be further operated in the direction of the lower limit or in the direction of the upper limit.

Accordingly, the results of the inference in the repair plan are outputted as a combination in an actuator means which can be actually operated, thereby to make it possible to make practical inference in the repair plan by using the above described construction for each of a plurality of actuators or an arbitrary actuator therein.

Meanwhile, the above described method of setting the operation range is one example. The operation range may be set by another method and compared with the actual state of an actuator.

Furthermore, the adjustable range and the actual value of the adjusted state of the set actuator are not only compared with each other in the repair plan portion 15 but also may be compared with each other and referred to in making a fault diagnosis in the fault diagnosis portion 12.

Additionally, an image forming apparatus according to the present embodiment may be provided with, for example, a self-diagnosis mode setting key or switch which is manually operated as self-diagnosis a mode setting means such that the above described self-diagnosis and/or self-repair can be made only when the self-diagnosis mode setting key or switch is operated.

The self-diagnosis mode setting key or switch may be arranged in an arbitrary position, which preferably is provided in a position different from that of an operation key or the like for normal image formation, for example, inside of an image forming apparatus such that it can be operated by opening a front panel provided in the image forming apparatus.

According to the present invention, if the state of the image forming apparatus is abnormal, it can be judged whether or not a fault exists and the fault is inferred by only measuring state data and inputting the same from data input means. Accordingly, a serviceman or the like can simply repair the fault of the image forming apparatus by only selecting an actuator means and operating the same so as to remove the fault inferred.

As described in the foregoing, according to the present invention, there can be provided an image forming apparatus having a system capable of making semi-automated self-diagnosis of, if it is considered that a fault is caused, the fault by only inputting data and making a repair based on the self-diagnosis.

Furthermore, according to the present invention, the fault is based on qualitative data common to image forming apparatuses. Accordingly, there can be provided an image forming apparatus having a self-diagnosis and repair system capable of handling unknown faults which are not clearly expressed.

Additionally, a self-diagnosis and repair system according to the present invention can be applied not to a particular image forming apparatus but to a lot of types of image forming apparatuses. As a result, there can be provided an image forming apparatus having a low-cost self-diagnosis and repair system.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A self-repairing system for an image-forming apparatus which includes a plurality of interrelated elements, the interrelated elements including actuator elements which control operations carried out by the elements of the apparatus, and sensor means for sensing conditions in the apparatus and providing condition data indicative thereof, said system comprising:

memory means for storing characteristic data representative of various characteristics of the apparatus, interrelationship knowledge representative of the interrelationships of the elements of the apparatus, and diagnostic knowledge;

diagnostic means for determining whether the apparatus is in a normal or an abnormal condition based upon condition data from the sensor means, the characteristic data and the diagnostic knowledge;

selection means, responsive to a determination by the diagnostic means that the apparatus is in an abnormal condition, for selecting one of the actuator elements to influence one of the operations in the apparatus based upon the characteristic data and the interrelationship knowledge; and actuator control means for controlling an actuator means selected by the selection means to influence the one operation.

2. A self-repairing system for an image-forming apparatus as claimed in claim 1, wherein said characteristic data comprises repair knowledge and wherein the selection means selects the actuator element in the apparatus based upon the repair knowledge and the interrelationship knowledge.

3. A self-repairing system for an image-forming apparatus as claimed in claim 2, wherein said system comprises conversion means for converting condition data from the sensor means to symbolic data and wherein the diagnostic means determines the condition of the apparatus from symbolic data provided by the conversion means, and the diagnostic knowledge.

4. A self-repairing system for an image-forming apparatus as claimed in claim 3, wherein the selection means comprises repair plan inference means.

5. A self-repairing system for an image-forming apparatus as claimed in claim 4, wherein said system further comprises updating means for updating certain of the characteristic data based upon condition data provided by the sensor means, after the apparatus has been returned to its normal condition.

6. A self-repairing system for an image-forming apparatus as claimed in claim 4, wherein the characteristic data comprises reference value data and the interrelationship knowledge comprises mathematical model knowledge.

7. A self-repairing system for an image-forming apparatus as claimed in claim 6, wherein the reference value data represent desired operating ranges for parameters associated with the elements of the apparatus and wherein the updating means changes an original desired operating range to a new desired operating range if, after the apparatus has been returned to its normal condition, a parameter falls outside of its original desired operating range.

8. A self-repairing system for an image-forming apparatus as claimed in claim 4, wherein the diagnostic means infers a possible fault cause from the interrelationship knowledge.

9. A self-repairing system for an image-forming apparatus as claimed in claim 8, wherein the characteristic data comprises reference value data, and the interrelationship knowledge comprises mathematical model knowledge and substance model knowledge.

10. A self-repairing system for an image-forming apparatus as claimed in claim 9, wherein the characteristic data comprises first characteristic data which includes the reference value data and second characteristic data which is representative of materials operated upon by the apparatus.

11. A self-repairing system for an image-forming apparatus as claimed in claim 10, wherein the second characteristic data is representaive of copy paper and toner conditions.

12. A self-repairing system for an image-forming apparatus which includes a plurality of interrelated elements, the interrelated elements including actuator elements which control operations carried out by the elements of the apparatus, and sensor means for sensing conditions in the apparatus and providing condition data indicative thereof, said system comprising:
 a memory for storing characteristic data representative of various characteristics of the apparatus, interrelationship knowledge representative of the interrelationships of the elements of the apparatus, and diagnostic knowledge;
 diagnostic means for determining whether the apparatus is in a normal or an abnormal condition based upon condition data from the sensor means, the characteristic data and the diagnostic knowledge;
 a selector, responsive to a determination by the diagnostic means that the apparatus is in an abnormal condition, for selecting one of the actuator elements to influence one of the operations in the apparatus based upon the characteristic data and the interrelationship knowledge;
 a controller for controlling an actuator means selected by the selection means to influence the one operation and thereby return the apparatus to its normal condition; and
 updating means for updating certain of the characteristic data based upon condition data provided by the sensor means after the apparatus has been returned to its normal condition.

13. A self-repairing system for an image-forming apparatus as claimed in claim 12, wherein the characteristic data comprises reference value data representative of an original desired operating range for a parameter associated with one of the elements and wherein the updating means changes the original desired operating range to a new desired operating range if, after the apparatus has been returned to its normal condition, the parameter falls outside of the original desired operating range.

14. A self-repairing system for an image-forming apparatus as claimed in claim 13, wherein said system comprises a symbolic converter for converting condition data from the sensor means to symbolic data in accordance with the desired operating range, wherein the diagnostic knowledge comprises function evaluation knowledge, and wherein the diagnostic means compares symbolic data from the converter to the function evaluation knowledge to determine an abnormal condition.

15. A self-repairing system for an image-forming apparatus as claimed in claim 14, wherein the selector comprises repair plan inferring means.

16. A self-repairing system for an image-forming apparatus which includes a plurality of interrelated elements, the interrelated elements including actuator elements which control operations carried out by the elements of the apparatus, and sensor means for sensing conditions in the apparatus and providing condition data indicative thereof, said system comprising:
 memory means for storing characteristic data which includes repair knowledge representative of various characteristics of the apparatus, interrelationship knowledge representative of the interrelationships of the elements of the apparatus, and diagnostic knowledge including function evaluation knowledge, and fault cause knowledge;
 diagnostic means for determining whether the apparatus is in a normal or an abnormal condition based upon condition data from the sensor means, the characteristic data, and the function evaluation knowledge, and for inferring possible fault causes based upon the interrelationship knowledge when the apparatus is determined to be in an abnormal condition; and
 repair plan inference means, responsive to a determination by the diagnostic means that the apparatus is in an abnormal condition, for applying the interrelationship knowledge and the repair knowledge to infer a repair plan by which to control one of the actuator elements to influence one of the operations in the apparatus.

17. A self-repairing system for an image-forming apparatus as claimed in claim 16, wherein the repair plan inference means applies the repair knowledge to infer appropriate repair plans for a possible fault cause identified by the diagnostic means and applies the interrelationship knowledge and the possible fault cause to infer a repair plan which will cause minimum secondary affects from among the inferred appropriate repair plans.

18. A self-repairing system for an image-forming apparatus as claimed in claim 17, wherein the repair plan inference means applies the repair knowledge to infer appropriate repair plans for a possible fault cause identified by the diagnostic means, and applies the interrelationship knowledge and the possible fault cause to assign a priority to each of the inferred repair plans with the repair plan which is determined to cause minimum secondary affects assigned the highest priority.

19. A self-repairing system for an image-forming apparatus as claimed in claim 18, wherein, if the highest priority repair plan is unsuccessful, the repair plan inference means controls another of the actuator elements according to the repair plan having the next highest priority.

20. A self-repairing system for an image-forming apparatus as claimed in claim 19, wherein said system further comprises updating means for updating certain of the characteristic data based upon condition data provided by the sensor means after one of the inferred repair plans has been performed and the apparatus has been returned to its normal condition.

21. A self-repairing image-forming apparatus comprising:
 interrelated elements including actuator elements which control operations in the apparatus;
 sensor means for sensing conditions in the apparatus and providing condition data indicative thereof;
 memory means for storing characteristic data representative of various characteristics of the apparatus, interrelationship knowledge representative of the interrelationships of the various elements of the apparatus, and diagnostic knowledge;
 diagnostic means for determining whether the apparatus is in a normal or an abnormal condition based upon condition data from the sensor means, the characteristic data and the diagnostic knowledge;
 selection means, responsive to a determination by the diagnostic means that the apparatus is in an abnormal condition, for selecting one of the actuator elements to influence one of the operations in the apparatus based upon the characteristic data and the interrelationship knowledge; and actuator control means for controlling an actuator means selected by the selection means to influence the operation.

22. A self-repairing image-forming apparatus as claimed in claim 21, comprising conversion means for converting condition data from the sensor means to symbolic data and wherein the diagnostic means determines the condition of the apparatus from symbolic data from the conversion means and the diagnostic knowledge.

23. A self-repairing image-forming apparatus as claimed in claim 22, wherein the characteristic data comprises repair knowledge and wherein the diagnostic means identifies a fault symptom and wherein the selection means comprises repair plan inference means, which selects the one actuator element based upon a fault symptom identified by the diagnostic means, the interrelationship knowledge, and the repair knowledge.

24. A self-repairing image-forming apparatus as claimed in claim 23, wherein said system further comprises updating means for updating certain of the characteristic data based upon condition data provided by the sensor means, after the apparatus has been returned to its normal condition.

25. A self-repairing image-forming apparatus as claimed in claim 24, wherein the characteristic data comprises reference value data and the interrelationship knowledge comprises mathematical model knowledge.

26. A self-repairing image-forming apparatus as claimed in claim 25, wherein the reference value data represent desired operating ranges for parameters associated with the elements of the apparatus and wherein the updating means changes certain of the characteristic data by changing an original desired operating range to a new desired operating range if, after the apparatus has been returned to its normal condition, a parameter falls outside of the original desired operating range.

27. A self-repairing image-forming apparatus as claimed in claim 26, wherein the characteristic data comprises first characteristic data which includes the reference value data and second characteristic data which is representative of materials operated upon by the apparatus.

28. A self-repairing image-forming apparatus as claimed in claim 27, wherein the second characteristic data is representative of copy paper and toner conditions.

29. A self-repairing image-forming apparatus as claimed in claim 23, wherein the diagnostic means infers a possible fault cause from the interrelationship knowledge.

30. A self-repairing method for an image-forming apparatus which has a plurality of interrelated elements, the interrelated elements including actuator elements for carrying out operations in the apparatus, sensor means for sensing conditions of the actuator elements, and memory means which stores characteristic data representative of various characteristics of the apparatus, interrelation knowledge representative of the interrelationships of the elements of the apparatus, and diagnostic knowledge, said method comprising the steps of:

determining whether the apparatus is in a normal or an abnormal condition based upon condition data from the sensor means, the characteristic data and the diagnostic knowledge;

if the apparatus is in an abnormal condition, selecting one of the actuator elements to influence one of the operations in the apparatus based upon the characteristic data and the interrelationship knowledge; and controlling the selected one of the actuator elements to influence the one operation.

31. A method of self-repair as claimed in claim 30, comprising the steps of converting condition data from the sensor means to symbolic data.

32. A method of self-repair as claimed in claim 31, wherein the characteristic data comprises reference value data and said method further comprises the step of updating the stored reference value data based upon the symbolic data after the apparatus has been returned to its normal condition.

33. A method of self-repair as claimed in claim 32, wherein the reference value data represent desired operating ranges for parameters associated with the elements of the apparatus, and the step of updating the reference value data comprises the steps of changing an original desired operating range to a new desired operating range.

34. A method of self-repair as claimed in claim 32, wherein the step of selecting one of the actuator elements comprises the steps of:

identifying a fault symptom; and inferring repair plans based upon an identified symptom and the interrelationship knowledge.

35. A method of self-repair as claimed in claim 34, wherein the step of identifying a fault symptom comprises identifying a possible fault cause.

36. A method of self-repair as claimed in claim 35 wherein diagnostic knowledge comprises function evaluation knowledge, and wherein the step of determining whether the apparatus is in a normal or an abnormal condition comprises the steps of comparing the symbolic data with the function evaluation knowledge.

37. A method of self-repair as claimed in claim 36, wherein the step of inferring repair plans comprises the steps of:

inferring secondary affects attributable to each inferred repair plan based upon the interrelationship data and the possible fault cause, selecting a repair plan having the least inferred secondary affects from among the inferred repair plans, and selecting the actuator element capable of influencing operations of the apparatus in accordance with the selected repair plan.

38. A method of self-repair as claimed in claim 35, the memory means stores repair rule knowledge, wherein the steps of inferring a repair plan comprise the steps of inferring sequences of steps for reducing an inferred secondary affect and applying the repair rule knowledge to select a preferred sequence, and wherein the repair rule knowledge comprises knowledge that (a) a preferred sequence must not include a step which is contradictory with a step in the selected repair plan, (b) the preferred sequence must be inferred to have minimum further secondary affects, and (c) the preferred sequence is aborted if an operation forms a sequentional loop during performance of the preferred sequence.

39. A method of self-repair as claimed in claim 38, wherein if a selected repair plan fails, an alternative repair plan is selected on the basis of the next least number of inferred secondary affects.

* * * * *